United States Patent [19]

Gammill et al.

[11] 3,760,006

[45] Sept. 18, 1973

[54] ION EXCHANGE CATALYSTS FOR THE PREPARATION OF BISPHENOLS

[75] Inventors: Benny B. Gammill, Lake Jackson; Glen R. Ladewig, Freeport; George E. Ham, Lake Jackson, all of Tex.

[73] Assignee: The Dow Chemical Company, Midland, Mich.

[22] Filed: June 28, 1971

[21] Appl. No.: 157,721

Related U.S. Application Data

[62] Division of Ser. No. 17,291, March 6, 1970, Pat. No. 3,634,341.

[52] U.S. Cl. .............................................. 260/619 A
[51] Int. Cl. ...................... C07c 39/16, C07c 37/00
[58] Field of Search ................................. 260/619 A

[56] References Cited

UNITED STATES PATENTS

| 3,049,569 | 8/1962  | Apel et al. | 260/619 A   |
| 3,153,001 | 10/1964 | Apel et al. | 260/619 A X |
| 3,049,568 | 8/1962  | Apel et al. | 260/619 A   |
| 3,242,220 | 3/1966  | Apel et al. | 260/619 A   |
| 3,242,219 | 3/1966  | Apel et al. | 260/619 A   |

Primary Examiner—Leon Zitver
Assistant Examiner—Norman Morgenstern
Attorney—Griswold and Burdick

[57] ABSTRACT

Modification of an insoluble strong-acid cation-exchange resin in acid form by partial neutralization with a thiazolidine yields an improved catalyst for the preparation of bisphenols by condensation of a phenol and a ketone.

4 Claims, No Drawings

ION EXCHANGE CATALYSTS FOR THE PREPARATION OF BISPHENOLS

The present application is a divisional application of our prior U.S. application Ser. No. 17,291, filed Mar. 6, 1970, now U.S. Pat. No. 3,634,341.

BACKGROUND OF THE INVENTION

Certain sulfur compounds have long been recognized as effective promoters for the acid catalyzed condensation of phenols and ketones to form bisphenols. For example, in U. S. Pat. No. 2,359,242 Perkins and Bryner describe the use of $H_2S$ in the condensation of phenol with acetone methyl ethyl ketone, cyclohexanone, and other similar ketones. In U. S. Pat. No. 2,917,550 Dietzler recommends as a promoter a soluble sulfur compound such as $H_2S$, methyl mercaptan, ethyl mercaptan or N-octyl mercapton. Such soluble promoters, however, introduce subsequent problems in the purification of the bisphenol.

McNutt and Gammill in U. S. Pat. No. 3,394,089 teach a method of modifying insoluble strong-acid cation-exchange resins in the acid form by partial neutralization with a mercaptoamine. The modification of the strong-acid cation-exchange resin was shown to give an improved strong acid catalyst for the preparation of bisphenols. In spite of this improvement, still better catalysts have been sought to lessen the amounts of undesirable impurities formed, give a product of higher purity and shorten the induction time before acceptable product can be obtained.

SUMMARY OF THE INVENTION

The present invention is a new catalyst prepared by partially neutralizing an insoluble strong acid cation exchange resin in the acid form with a thiazolidine having the general formula

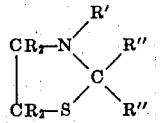

where
each R is H, methyl or ethyl
each R' is H, alkyl, hydroxyalkyl, cyanoalkyl, aminoalkyl, cycloalkyl, phenalkyl, phenyl or alkylphenyl of up to about 10 carbon atoms
each R'' is H, alkyl, cycloalkyl, phenalkyl, phenyl or alkylphenyl of up to about 10 carbon atoms or together R'' may form an alkylene of four to six carbon atoms.

These new catalysts improve the preparation of bisphenols by the condensation of a phenol with a ketone by increasing the efficiency of the strong-acid resin, shortening the induction time and lessening product contamination.

The improved catalyst of the present invention can be prepared using any insoluble strong-acid cation-exchange resin. Particularly suitable are aromatic sulfonic acid resins having a cation-exchange capacity of at least 0.5 and advantageously 2.0 or more meq./g. dry weight. Commercial strong-acid resins prepared by the sulfonation of a styrene-divinyl-benzene resin, as described for example, by Bodamer in U. S. Pat. No. 2,597,438, by Wheaton and Harrington in U. S. Pat. No. 2,642,417 or Bortnick in U. S. Pat. No. 3,037,052, are most satisfactory. Such commercial sulfonic acid resins as Dowex 50 resin, Amberlite IR-120 resin, Amberlite 200 resin and Duolite C-20 resin, which normally have an exchange capacity of 4.2–5.2 meq./g. dry weight, make superior resin catalysts after partial neutralization.

The thiazolidines of the present invention may suitably be any of those described by the general formula above. These thiazolidines may be simply prepared by the reaction of a ketone or aldehyde, an aziridine compound and $H_2S$ as described by Bestian in Ann. 566, 210 (1950). Typical examples of suitable thiazolidines include: thiazolidine; 2-alkyl and cycloalkyl thiazolidines, such as 2,2-dimethyl-, 2-methyl-2-ethyl-, 2-methyl-2-isobutyl-, 2-octyl-, 2-propyl-2-nonyl- and 2-cyclohexylthiazolidine; 2-phenalkyl, phenyl or alkylphenyl thiazolidines, such as 2-methyl-2-phenyl-, 2-p-tolyl- and 2-phenethylthiazolidine; 2,2-alkylene thiazolidines such as 2,2-pentamethylene and 2,2-hexamethylenethiazolidine; 3-alkyl, hydroxyalkyl, cyanoalkyl, aminoalkyl and cycloalkylthiazolidines, such as 3-methyl-, 3-decyl-, 3-cyanoethyl, 3-aminopropyl, 3-hydroxyethyl and 3-cyclohexylthiazolidine; 3-phenalkyl, phenyl and alkylphenylthiazolidines, such as 3-benzyl, 3-phenyl and 3o-ethylphenylthiazolidine; 4,5-methyl and ethylthiazolidines, such as 4-methyl-, 4,5-dimethyl-, 5-ethyl- and 4,5-diethylthiazolidine; and thiazolidines containing substituents in more than two positions, such as 2,2,4,5-tetramethyl-, 2,2-dimethyl-3-aminoethyl-, 2-phenyl-3-propyl-4-ethyl-, 2-methyl-2-benzyl-4,5-diethyl-, 2-p-tolyl-2-ethyl-3-hydroxyethyl-, and 2-pentamethylene-3-cyclohexyl-4,5-dimethylthiazolidine.

Of the thiazolidines described by the general formula above, those in which each R is hydrogen are preferred. Also preferred are those compounds wherein each R' and R'' is hydrogen or an alkyl of one to five carbon atoms. Especially preferred in the present invention is the use of 2,2-dimethylthiazolidine, i.e., where each R and R' are H and each R'' is methyl in the general formula.

To obtain the improved cation exchange resin catalyst, the strong-acid resin is usually partially neutralized with the thiazolidine by direct neutralization of the free acid resin. The degree of neutralization is readily verified by measuring the ion exchange capacity of the resin before and after partial neutralization.

The extent of the neutralization of the catalyst of the thiazolidine may vary widely. About 5 to about 35 mole percent of the strong-acid groups of the cation-exchange resin can be neutralized, with the neutralization of 15 to 25 mole percent of the strong-acid groups being preferred. As a general rule, neutralization of a high percentage of the exchange capacity impairs the efficiency of the catalyst in the preparation of bisphenols and should be avoided. Particularly effective catalysts are obtained by neutralizing 15 to 20 percent of the cation-exchange capacity of a sulfonated aromatic resin having an initial exchange capacity of about 4.5 to 5.2 meq./g. dry weight $H^+$ form giving a modified resin having a capacity of about 3.6 to 4.4 meq./g. dry weight $H^+$ form.

The water content of the partially neutralized catalyst is an important process variable. Although some water is always present as a by-product of the phenol-ketone condensation, the catalyst efficiency is impaired if the water content of the reaction mixture is greater than about 2-3 weight percent. A steady state water content of about 0.5-1.0 weight percent is preferred. When the modified resin is used in a fixed bed continuous reactor, the resin catalyst can be dried if necessary by pretreating the resin bed with anhydrous phenol. Thereafter, the mole ratio and feed rates of the reactants can be adjusted to achieve a suitable conversion and eluent water content.

The partially neutralized cation-exchange resin of the invention is an effective catalyst for the preparation of many bisphenols. The phenolic reactant must be unsubstituted in the para position, but can be substituted with one or more alkyl, halo, or other similar nonreactive groups in the positions ortho and meta to the phenolic group. Suitable phenols include phenol, o- and m-cresol, o- and m-chlorophenol, o-bromophenol, o-sec.-butylphenol, o-t-butylphenol, 2,6-dibromophenol, 2,6-di-t-butylphenol, 6-chloro-o-cresol, and o-phenylphenol.

As the ketone reactant, methyl ketones such as acetone, methyl ethyl ketone, methyl isobutyl ketone and acetophenone are preferred. However, cyclohexanone and other cyclic ketone as well as halo substituted methyl ketones like 1,3-dichloroacetone can also be used.

The preparation of bisphenols using the partially neutralized strong-acid cation-exchange resin as catalyst occurs readily under the normal conditions for the condensation of a phenol and ketone using a conventional cation-exchange resin or soluble catalyst. An excess of phenol is generally desirable to achieve a high conversion of the ketone. Thus from 2-25 moles of the phenol per mole of ketone are normally used with optimum conversions and efficiencies being obtained with a feed ratio of about 10-20 moles of phenol per mole of ketone.

The partially neutralized resin catalyst can be slurried with the reactants in a batch process or used in a conventional fixed bed column for continuous operation. The condensation in the presence of the modified catalyst occurs at temperatures ranging from 0° to 120°C. and preferably at about 20° to 100°C. at the lower temperatures, an inert diluent may be required to maintain fluidity. Normally atmospheric pressure is used.

The reaction time of course depends on the reaction temperature and the method of operation. In a batch process, a reaction time of from 0.1 to 20 hours or more may be required to achieve a desired conversion. In continuous operation using a fixed bed of catalyst, a flow rate of about 0.2 to 6.0 bed volumes per hour or an average contact time of about 0.16 to 5.0 hours is suitable. Using a partially neutralized catalyst having a residual exchange capacity of about 3.2-4.5 meq./g. dry weight, optimum results are obtained with a feed rate of about 1.0 to 3.0 bed volumes per hour at 60°-80°C.

After separating the product mixture from the insoluble catalyst, the bisphenol is readily recovered by conventional means. Normally water, excess phenol, and other light impurities are removed by flash distillation. The residual crude bisphenol has a minimum purity of 95 percent, good color and is uncontaminated with residual catalyst or promoters. Additional purification by distillation, crystallization, solvent washing and similar techniques readily give a product having a purity of 99+ percent.

SPECIFIC EMBODIMENTS

Example 1

Preparation of the Catalyst 2,500 Ml. of Dowex 50Wx8 ($H^+$) a sulfonic acid resin containing 4.95 meq/g. dry resin was washed with a volumetric excess of distilled water into a pot. To the water-resin slurry, 99.5 g. (0.85 mole) of 2,2-dimethylthiazolidine was added and the resin was stirred for 30 minutes. Excess water was decanted and the resin was then washed twice with fresh deionized water. To dry the product, the resin was slurried with excess phenol and the liquid was distilled at 100 mm. Hg, and the azeotropic mixture of phenol and water was distilled until the temperature of the distillate reached 100°C. The resin capacity before promotion was 4.95 meq./g. dry weight and after promotion was 3.97 meq./g. dry weight for a promotion of 20 percent.

Example 2

Use of Promoted Catalyst

A stainless steel reactor column was charged with 630 ml. of the promoted resin prepared in Example 1, and a mixture of phenol and acetone was passed through the column. After steady state conditions were achieved for given reaction temperature and feed rate, samples of the product stream were analyzed. The bisphenol A analyses were obtained by stripping unreacted acetone and excess phenol from the reaction product and analyzing the residual crude bisphenol A for percent o,p'-bisphenol A by the vapor phase chromatographic methods described by Gill in Anal. Chem. 36, 1,201 (1964) and for color in methanol solution using a Klett colorimeter calibrated to standard American Public Health Association (APHA) scale. The conditions and results at various times after starting the run are shown in Table I. The product was of acceptable purity, >95 percent, after 5 hours of operation.

Comparative Example A

TABLE I.—PREPARATION OF BISPHENOL A USING A PROMOTED CATALYST

| | Run time, hr. | T °C. | Feed rate, bed vol./hr. | Acetone conversion, percent | Bisphenol A Wt., percent[1] | Bisphenol A Percent, o, p'- | Bisphenol A APHA color |
|---|---|---|---|---|---|---|---|
| Example: | | | | | | | |
| 2 | 5 | 54-62 | 0.81 | 65.6 | 8.0 | 2.2 | 45 |
| 2 | 12.5 | 54-64 | 0.77 | 65.6 | 8.0 | 2.0 | 43 |
| 2 | 74.5 | 54-62 | 1.05 | 65.6 | 9.2 | 2.0 | 43 |
| A | 5 | 50-60 | 0.7 | 67.0 | 7.9 | | >600 |
| A | 24 | 51-60 | 0.68 | 67.0 | 7.9 | 1.8 | 110 |
| A | 44 | 50-60 | 0.71 | 69.5 | 8.2 | 3.9 | 120 |
| A | 116 | 50-60 | 0.73 | 69.5 | 8.2 | 4.7 | 97 |

[1] In effluent.

In the same manner as described in Example 1, Dowex 50Wx8 (H⁺) resin was 20 percent neutralized with 2-mercaptoethylamine hydrochloride according to U. S. Pat. No. 3,394,089. This promoted catalyst was then tested with the same feed as shown in Example 2, and the results of these tests are shown in Table I. The product was not of acceptable purity until after 12 hours of operation.

In the same manner as shown in Example 1, strong-acid cation-exchange resins may be promoted with 5–35 percent of 2-methyl-2-phenylthiazolidine, 2,2-(pentamethylene)thiazolidine, 2-methyl-2-carbethoxymethylthiazolidine, 2-methyl-2-dodecylthiazolidine, 2,2,4,5-tetramethylthiazolidine, 2,2,3-trimethylthiazolidine, 2,2-dimethyl-3-octylthiazolidine or 2-methyl-2-ethyl-3-aminoethylthiazolidine. In the same manner as shown in Example 2, these promoted catalysts may be used to prepare bisphenol A or other bisphenols by the condensation of a phenol and a ketone.

We claim:

1. In the process for preparing a bisphenol by the condensation of a phenol and a ketone in the presence of a strong-acid catalyst, the improvement comprising using as the acid catalyst an insoluble strong-acid cation-exchange resin which has a cation-exchange capacity of at least 0.5 meq./g. and in which about 5 to about 35 mole percent of the strong-acid groups have been neutralized with an amine neutralizing agent consisting essentially of a thiazolidine of the general formula

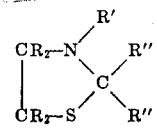

where
each R is H, methyl or ethyl,
each R' is H, alkyl, hydroxyalkyl, cyanoalkyl, aminoalkyl, cycloalkyl, phenalkyl, phenyl or alkylphenyl of up to about 10 carbon atoms,
each R'' is H, alkyl, cycloalkyl, phenalkyl, phenyl or alkylphenyl of up to about 10 carbon atoms or together R'' may form an alkylene of four to six carbon atoms.

2. The process of claim 1 wherein the phenolic reactant is phenol and the ketone is acetone.

3. The process of claim 1 wherein the temperature is 0° to 120°C.

4. The process of claim 1 wherein each R and R' of the thiazolidine are H and each R'' is methyl.

* * * * *